(12) United States Patent
Kuenzner et al.

(10) Patent No.: US 9,895,973 B2
(45) Date of Patent: Feb. 20, 2018

(54) MOTOR VEHICLE OPERATING DEVICE

(75) Inventors: Hermann Kuenzner, Freising (DE); Armin Distler, Munich (DE); Michael Herrler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2180 days.

(21) Appl. No.: 12/983,498

(22) Filed: Jan. 3, 2011

(65) Prior Publication Data

US 2011/0099520 A1  Apr. 28, 2011

Related U.S. Application Data

(63) Continuation of application No. PCT/EP2009/004238, filed on Jun. 12, 2009.

(30) Foreign Application Priority Data

Apr. 7, 2008 (DE) .......................... 10 2008 031 720

(51) Int. Cl.
*G06F 3/00* (2006.01)
*B60K 35/00* (2006.01)
(Continued)

(52) U.S. Cl.
CPC .............. *B60K 35/00* (2013.01); *B60K 37/06* (2013.01); *G06F 3/0482* (2013.01); *B60K 2350/1004* (2013.01); *G06F 3/048* (2013.01)

(58) Field of Classification Search
CPC .................................................... G06F 3/0482
(Continued)

(56) References Cited

U.S. PATENT DOCUMENTS 6,587,130 B1    7/2003  Amari et al.
2006/0250577 A1* 11/2006  Cieler et al. .................. 351/210
(Continued)

FOREIGN PATENT DOCUMENTS

DE      199 53 855 A1   5/2000
DE      102 07 872 A1   9/2003
(Continued)

OTHER PUBLICATIONS

Audi A6/A6 Avant Quick Reference Guide, Audi AG, 2007, pp. 1-8.*
(Continued)

*Primary Examiner* — Kieu Vu
*Assistant Examiner* — Andrew Chung
(74) *Attorney, Agent, or Firm* — Crowell & Moring LLP

(57) ABSTRACT

A motor vehicle operating device has a display device, an operating element and a control device, which are mutually coupled and set up such that an operating element symbol that corresponds to the operating element with respect to its outline shape is displayed on the display device. Navigation through a hierarchical menu structure displayed on the display device can take place or takes place by use of the operating element. The operating element can be operated corresponding to a plurality of operating degrees of freedom. Different groups of operating degrees of freedom are enabled for the navigation at different locations of the hierarchical menu structure. Those operating degrees of freedom enabled at the current location of the menu structure are displayed on or at the operating element symbol.

8 Claims, 2 Drawing Sheets

(51) Int. Cl.
  *G06F 3/0482* (2013.01)
  *B60K 37/06* (2006.01)
  *G06F 3/048* (2013.01)

(58) Field of Classification Search
  USPC .................................................. 715/822, 810
  See application file for complete search history.

(56) References Cited

U.S. PATENT DOCUMENTS

2006/0279541 A1* 12/2006 Kim et al. .................... 345/158
2007/0136690 A1* 6/2007 MacLaurin et al. .......... 715/822

FOREIGN PATENT DOCUMENTS

DE     10 2004 033 278 A1    2/2006
EP             0 893 750 B1    1/1999
WO    WO 2008/089802 A1    7/2008

OTHER PUBLICATIONS

Owner's Manual for Vehicle, BMW AG, Feb. 2007, 16-21.*
International Search Report dated Sep. 9, 2009 including English-language translation (Four (4) pages).

* cited by examiner

MOTOR VEHICLE OPERATING DEVICE

CROSS REFERENCE TO RELATED APPLICATIONS

This application is a continuation of PCT International Application No. PCT/EP2009/004238, filed Jun. 12, 2009, which claims priority under 35 U.S.C. § 119 from German Patent Application No. DE 10 2008 031 720.9, filed Jul. 4, 2008, the entire disclosures of which are herein expressly incorporated by reference.

This application contains subject matter related to U.S. application Ser. No. 12/983,490, entitled "Motor Vehicle Operating Device," filed on even date herewith.

BACKGROUND AND SUMMARY OF THE INVENTION

The invention relates to a motor vehicle operating device.

Increasingly, modern motor vehicles have an operating device constructed separately from a display device in the area of the center console. Such an operating device is known, for example, from European patent document EP 0893750 B1. In this case, the operating device has a switching element which can be bidirectionally rotated about its axis of symmetry and which, in addition, is disposed in an axially movable (pushable) and tiltable or slidable manner. As a result, by means of a rotating, pushing and/or tilting/sliding of the switching element, for example, menu items can be marked and selected or parameters can be set on a display device.

It is now an object of the invention to provide an improved motor vehicle operating device.

This and other objects are achieved by a motor vehicle operating device according to the invention having a display device, an operating element and a control device which are mutually coupled and set up with respect to the hardware and/or the program such that the display device shows an operating element symbol, which corresponds to the operating element with respect to the outline shape (for example, a circle).

By use of the operating element, a navigation can take place through a hierarchical menu structure displayed on the display device. In this case, navigation also includes the selecting or marking of menu levels or menu items or the setting of parameters within a menu level or a menu item.

The operating element, such as a rotary push element or a rotary, push, slide (swivel) element, can be operated corresponding to a plurality of operating degrees of freedom (or operating actions). At different locations, for example, menu items or menu levels of the hierarchical menu structure, different groups of operating degrees of freedom are enabled for the navigation and, in particular, cause a further navigation through the hierarchical menu structure or a further operation.

Groups of degrees of freedom are, for example:
Group 1: Movement to the right
Group 2: Movement to the left
Group 3: Movement in the upward (or forward) direction
Group 4: Movement to the right and left
Group 5: Movement to the right and left and in the upward direction
Group 6: Movement to the right and in the upward direction
Group 7: Movement to the right and rotating
Group 8: Movement to the right and left, and in the upward and downward (or rearward) direction, etc.

All or some of the operating degrees of freedom enabled at the current location of the menu structure (for example, movement to the right, tilting, sliding or rotating) are displayed on or at the operating element symbol, for example, by the display of arrow symbols.

The driver thereby recognizes which operating actions are currently possible or active. As a result, the reliable, fast and error-free navigation through a menu structure is facilitated, particularly during the drive. This advantage is still intensified by the following further developments.

Operating degrees of freedom (particularly pushing), which are enabled at every location of the menu structure are preferably not or never displayed, particularly by arrow symbols.

Preferably, operating degrees of freedom not enabled at the current location of the menu structure are not displayed.

A further development provides that a selection of a menu item from a plurality of menu items, which can be made based on a rotating degree of freedom of the operating element, is displayed, wherein a line is displayed extending from the operating element symbol in the direction of a selected menu item representation, which is part of a plurality of selectable menu item representations.

The menu item representation, which is part of a plurality of selectable menu item representations and in whose direction the line display extends that starts from the operating element, advantageously takes place in a highlighted manner.

An operating action corresponding to the rotating degree of freedom preferably has the effect that, starting from the operating element symbol, a line is displayed in the direction of a menu item representation which is adjacent to the menu item representation presently selected and which is part of a plurality of selectable menu item representations (no longer in the direction of the menu item representation selected so far).

An operating action corresponding to the rotating degree of freedom preferably has the effect that the menu item representation which is adjacent to the menu item representation selected so far (i.e., the menu item presently selected) and is part of a plurality of selectable menu item representations and in whose direction the line display extends which starts from the operating element, is displayed in a highlighted manner. The menu item representation selected so far no longer takes place in a highlighted manner.

In the case of the simultaneous representation of different menu levels, of which one menu level is active (or selected; marked, for example, by a highlighted representation of the menu level), the operating element symbol is preferably always displayed in a manner assigned to the active menu level. The operating element symbol is, for example, displayed in the proximity of the active menu level, completely or partially superimposed on the active menu level and/or in a void of the menu level representation provided for this purpose.

It is particularly preferred that, as a result of a movement of the operating element in a direction which, starting from the display of the operating symbol, corresponds to the direction of a representation of a further menu level, the further menu level will become active (the previously active menu level will become inactive) and the operating element symbol will be displayed in a manner assigned to this now active menu level.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
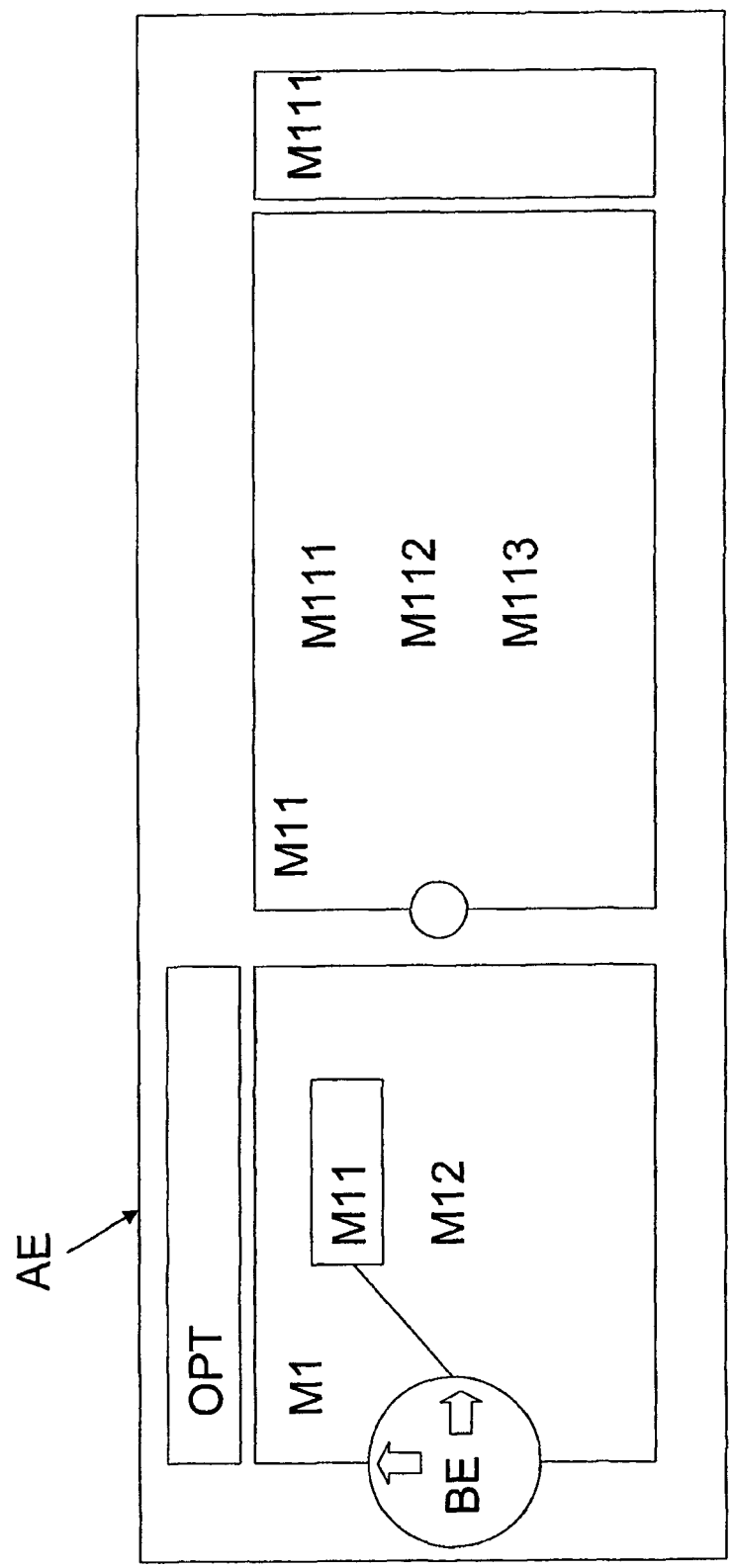
FIGS. 1 and 2 are views of two display statuses of an operating device in accordance with an exemplary embodiment of the invention.

FIG. 1 illustrates a display device AE as part of a motor vehicle operating device, which also includes an operating element and a control device.

The operating element (not shown) may, for example, be a rotary, push, tilt (rocker or slide) element that is known per se and can basically be operated corresponding to a plurality of operating degrees of freedom (one or more rotating degrees of freedom and/or a pushing degree of freedom and/or one or more swiveling or sliding degrees of freedom). By use of the operating element, a user can navigate through a hierarchical menu structure displayed on the display device AE.

An operating element symbol BE is displayed on the display device AE, which operating element symbol BE corresponds to the operating element with respect to its outline shape (or in some other user readily recognized corresponding fashion) and is therefore displayed here in a circular shape.

Different groups of operating degrees of freedom are enabled for the navigation at different locations of the hierarchical menu structure. As an example, FIG. 1 shows a first location of the hierarchical menu structure which is coupled, for example, with a first display status (or operating status).

Three menu levels M1, M11, M111 are displayed at this location of the hierarchical menu structure. In addition, an option menu OPT is displayed, which is part of menu level M1.

The instantaneously active or selected menu level M1 is displayed in a highlighted fashion (for example, in a particularly bright, high-contrast or especially colored fashion). Furthermore, the operating element symbol BE is displayed to be superimposed on this active menu level M1.

The operating degrees of freedom of the operating element enabled or usable at this location of the menu structure are displayed on the operating element symbol BE: The arrows symbols point to a possible tilting or sliding of the operating element in the upward direction (or forward) and toward the right. Operating degrees of freedom not enabled at the current location of the menu structure (for example, "sliding or tilting toward the left") are not displayed.

The selection of a menu item from a plurality of menu items that can be made based on a rotating degree of freedom of the operating element is displayed in that, starting from the operating element symbol BE, a line is displayed in the direction of a first menu item representation M11, which is part of a plurality of selectable menu item representations M11, M12.

An embodiment not illustrated in the figure provides that the tilting/sliding degrees of freedom are not displayed but only one of the rotating degrees of freedom are displayed.

The first menu item representation M11 is carried out in a highlighted, here, "framed" manner using a rectangular box frame.

Figure 2:
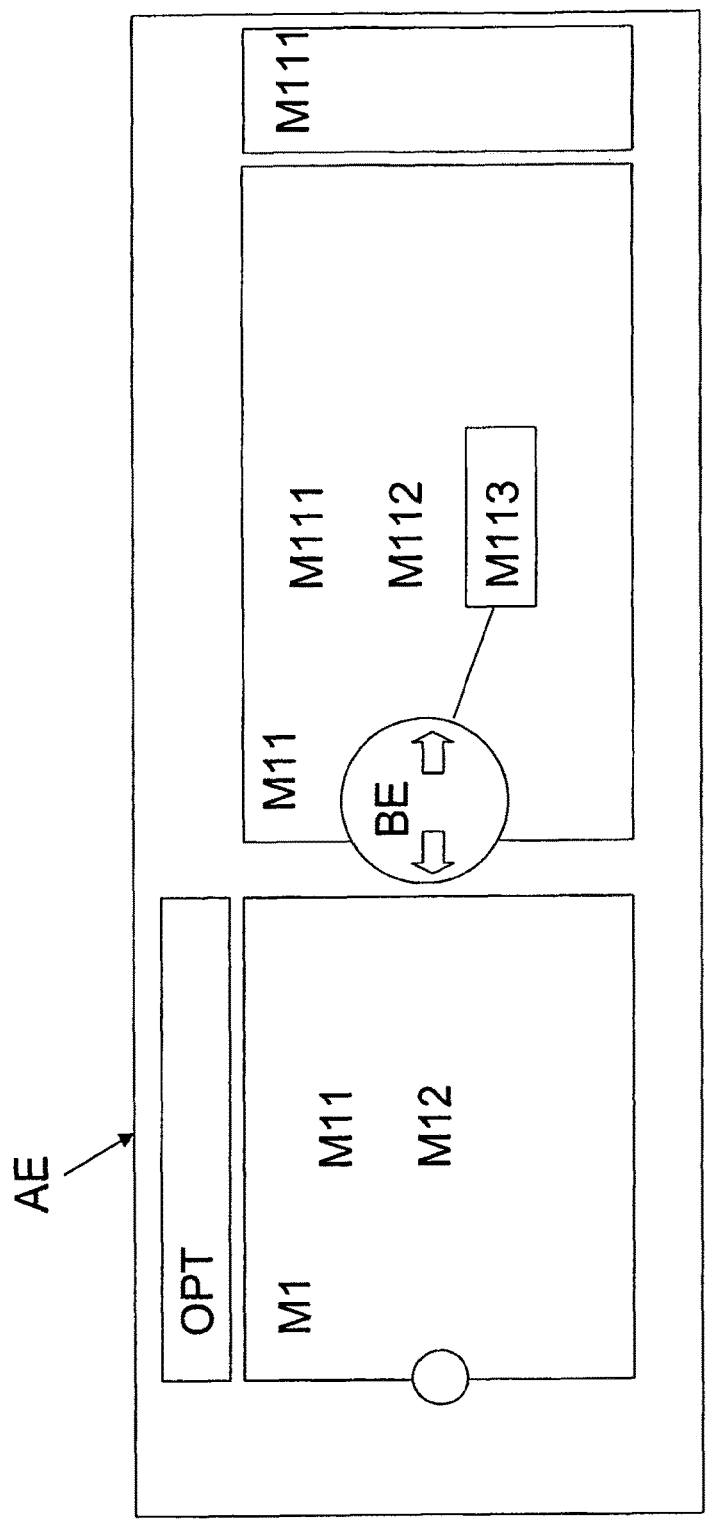

As a result of a movement of the operating element in a direction which, based on the display of the operating symbol BE, corresponds to the direction of a representation of a further menu level OPT, M11, the further menu level becomes active and the operating element symbol BE is displayed to be assigned to this now active menu level. For example, a display status is illustrated in FIG. 2 which is obtained when, based on the display status according to FIG. 1, the operating element is moved to the right.

Now, the menu level corresponding to the menu level representation M11 will be active. Menu level M1 will no longer be active. The operating element symbol BE will be superimposed on the now active menu level representation M11. A rotating degree of freedom is enabled again next to the two sliding/tilting degrees of freedom (arrow left, arrow right). However, now the rotating degree of freedom relates to menu items M111, M112, M113 of menu level M11, as indicated by the line display starting from the operating element symbol BE.

Menu item M113 is marked or selected. A pushing of the operating element now causes a confirmation of this selection of this menu item 113.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle operating device, comprising:
a display device; an operating element;
a control device, the display device, operating element and control device being operably configured to display on the display device an operating element symbol corresponding to an outline shape of the operating element; wherein
navigation through a hierarchical menu structure displayed on the display device occurs by use of the operating element, the operating element being operable in a plurality of directions corresponding to a plurality of operating degrees of freedom,
different groups of operating degrees of freedom are enabled for navigation at different locations of the hierarchical menu structure,
enabled operating degrees of freedom at a current location of the hierarchical menu structure, that correspond to directions in which the operating element must be moved to reach a different location of the hierarchical menu structure, are displayed within the operating element symbol on the display device, and
menu items selectable by the operating element in each enabled operating degree of freedom are not displayed within the operating element symbol on the display device,
wherein a selection of a menu item from a plurality of selectable menu items based on a rotating degree of freedom of the operating element is displayed with a line on the display device, the line starting from the operating element symbol and extending in a direction of a selected menu item representation, the selected menu item representation being a part of a plurality of selectable menu item representations.

2. The motor vehicle operating device according to claim 1, wherein the selected menu item representation occurs in a highlighted manner.

3. The motor vehicle operating device according to claim 2, wherein the operating element symbol is displayed in a manner assigned to an active menu level when more than one menu levels are simultaneously represented of which one menu level is active.

4. The motor vehicle operating device according to claim 1, wherein the operating element symbol is displayed in a manner assigned to an active menu level when more than one menu levels are simultaneously represented of which one menu level is active.

5. A motor vehicle operating device, comprising:
a display device; an operating element;
a control device, the display device, operating element and control device being operably configured to display on the display device an operating element symbol corresponding to an outline shape of the operating element; wherein
navigation through a hierarchical menu structure displayed on the display device occurs by use of the operating element, the operating element being operable in a plurality of directions corresponding to a plurality of operating degrees of freedom,
different groups of operating degrees of freedom are enabled for navigation at different locations of the hierarchical menu structure,
enabled operating degrees of freedom at a current location of the hierarchical menu structure, that correspond to directions in which the operating element must be moved to reach a different location of the hierarchical menu structure, are displayed within the operating element symbol on the display device, and
menu items selectable by the operating element in each enabled operating degree of freedom are not displayed within the operating element symbol on the display device,
wherein non-enabled operating degrees of freedom at the current location of the hierarchical menu structure are not displayed on the display device,
wherein a selection of a menu item from a plurality of selectable menu items based on a rotating degree of freedom of the operating element is displayed with a line on the display device, the line starting from the operating element symbol and extending in a direction of a selected menu item representation, the selected menu item representation being a part of a plurality of selectable menu item representations.

6. The motor vehicle operating device according to claim 5, wherein the selected menu item representation occurs in a highlighted manner.

7. A display device for a motor vehicle having an operating element with a plurality of operating degrees of freedom by which a user navigates a hierarchical menu structure displayable on the display device, comprising:
an operating element symbol displayed on the display device, the operating element symbol corresponding to the operating element in a user recognizable manner, wherein
operating degrees of freedom are enabled at a current location of the hierarchical menu structure, the enabled operating degrees of freedom corresponding to one or more directions in which the operating element must be moved to reach a different location of the hierarchical menu structure,
the enabled operating degrees of freedom are displayed within the operating element symbol on the display device, and
menu items selectable by the operating element in each enabled operating degree of freedom are not displayed within the operating element symbol on the display device,
wherein a line extends from the operating element symbol in a direction of a selected menu item representation from a plurality of selectable menu item representations on the display device, the line corresponding with a rotating degrees of freedom of the operating element.

8. A method of navigating a hierarchical menu structure on a display in a motor vehicle using an operating element having a plurality of operating degrees of freedom, the method comprising the acts of:
displaying a menu structure on the display;
displaying an operating element symbol corresponding to the operating element in a user recognizable manner;
displaying within the operating element symbol operating degrees of freedom, the operating degrees of freedom corresponding to directions in which the operating element must be moved to reach different enabled locations from a current location of the menu structure, and
displaying menu items selectable by the operating element in each enabled operating degree of freedom outside of the operating element symbol on the display device, and
when a selection of a menu item from a plurality of menu items is selectable based on a rotating degree of freedom of the operating element, displaying a line extending between the operating element symbol and a selected menu item representation that is part of a plurality of selectable menu item representations.

* * * * *